Patented July 6, 1954

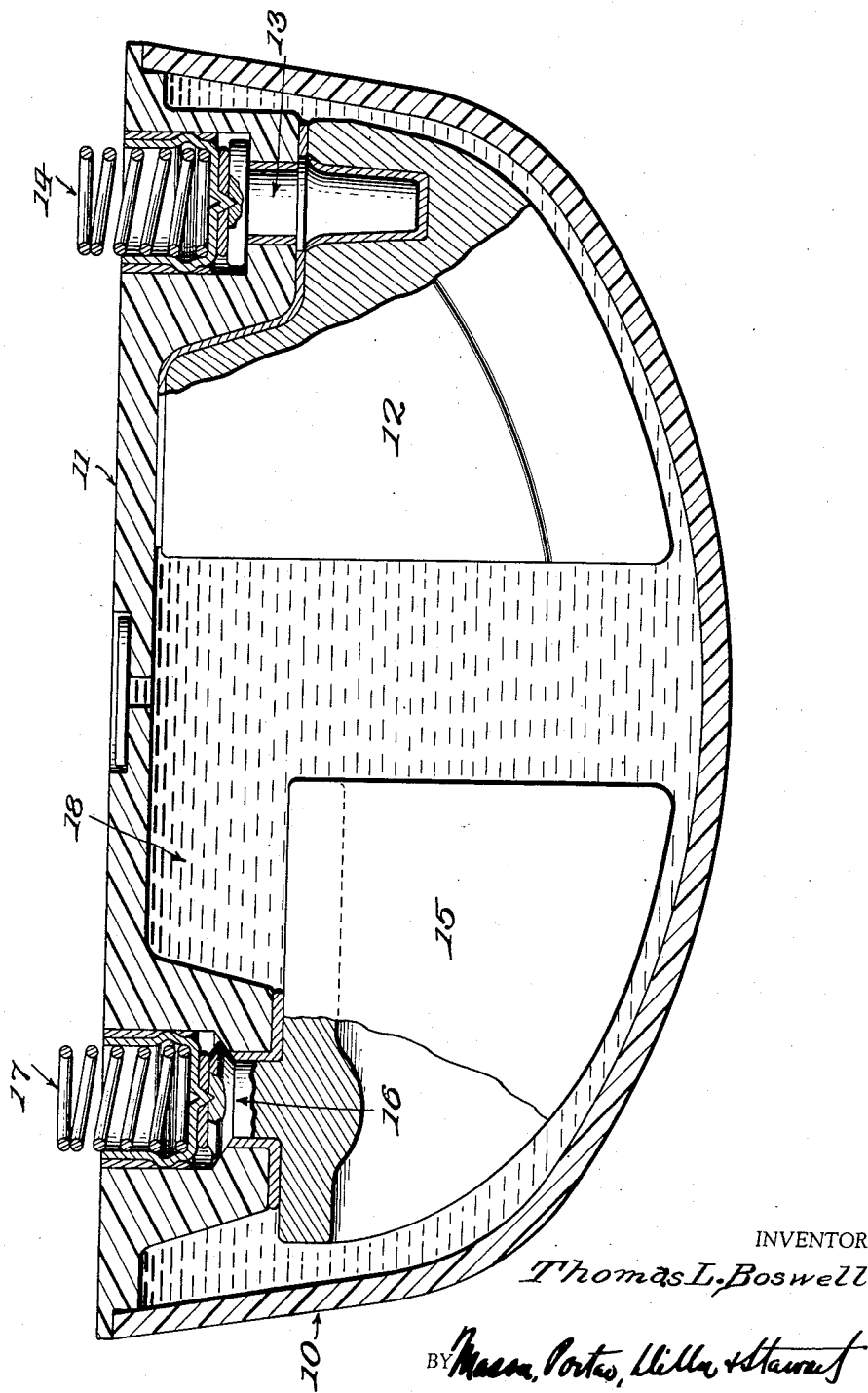

2,683,184

UNITED STATES PATENT OFFICE 2,683,184

ART OF ELECTRICAL ENERGY PRODUCING CELLS

Thomas L. Boswell, Elgin, Ill., assignor to Elgin National Watch Company, Elgin, Ill., a corporation of Illinois Application August 1, 1952, Serial No. 302,183

22 Claims. (Cl. 136—107)

This invention relates to an electrical energy producing cell employing indium as an anode material.

A feature is the provision of an electrical energy producing cell including indium as anode material and an alkaline electrolyte, and characterized by high volumetric efficiency, long shelf life, high electrochemical anode-conversion efficiency, and self-contained readiness for predetermined action under sealed conditions.

A feature is the production of an electrical energy producing cell having in its operative condition an anode presenting an effective surface of indium to an alkaline electrolyte.

A further feature of the invention is the provision of a voltaic cell of sealed type and characterized by long shelf life, freedom from disruption by evolution of gas, and freedom from leakage of electrolyte.

Another feature is the provision of an electrical energy producing cell in which the electrode activity is attained without reaching a condition of consumption of electrode material during storage, and in which a long operative life is attained with high efficiency of conversion of the electrode mass.

A further feature is the provision of an electrical energy producing cell in which the ratio of anode volume to faradays of electricity obtained is of the order of the zinc anode cell, but with freedom from the development of gas and with feasibility of operation in the absence of a special internal barrier or a special gelling agent so that a higher effective part of the total available space may be allotted to the effective elements of electrodes and electrolyte whereby a greater total output can be obtained than with the zinc system.

A further feature is the provision of an electrical energy producing cell which needs no special original internal barrier between electrodes even with a very fluid original electrolyte, i. e. in the absence of special original thickening or gelling agents, in that the products of anode conversion act to form an effective barrier during the operation of the cell.

A further feature is the provision of an electrical energy producing cell in which the anode conversion product establishes a non-fluent condition in the electrolyte for limiting escape to the exterior in the event of fault or rupture of the cell housing during or at the end of service.

Another feature is the provision of an electrical energy producing cell in which the total volume change of electrode and electrolyte materials is low during electrochemical conversion, thereby permitting the tight and maintained sealing of the cell during its life and avoiding non-tolerable increase of external dimensions of thin flexible walls, whereby the cell can be employed in a limited and predetermined space in close association with parts subject to damage by contact by an expanding housing or by contact with electrolyte.

A further feature is the provision of an electrical energy producing cell which can be of small size, tightly sealed, and competent of delivering current pulses at a predetermined rate and of individual energy content within a close range of maximum and minimum values over a long period of time; which is of particular importance for a cell employed for supplying an electrically actuated wrist watch for a time of a year or longer.

A further feature is the provision of an electrical energy producing cell having indium as an effective anode material and mercuric oxide as an effective cathode material, in the presence of an alkaline electrolyte; and demonstrating under operating conditions the supply of current pulses to a pre-selected load at a highly constant load-circuit voltage at temperatures over a range of minus 10 degrees C. to plus 40 degrees C., and exhibiting a thickening or increase of viscosity of the electrolyte during service in proportion to formation of metallic mercury at the cathode whereby tendency in the cathodic mass toward migration is opposed by the increase in electrolyte viscosity.

With these and other features as objects in view, an illustrative electrical cell according to the present invention is shown in the accompanying drawing.

In the supply of electrical energy to portable devices, use of a voltaic cell permits inclusion of the power source within the general structure. Voltaic cells, with their employment of two electrodes and an electrolyte, have been constituted in many ways. Zinc has been a common anodic material, used principally with alkaline and neutral electrolytes; but commercial cells of these types exhibit relatively short shelf lives, and evolution of gas. When the purpose of employment demands a possible shelf life of a year or more, and the evolution of current for a further time of a year or more, under conditions where gas evolution or electrolyte leakage may be so serious that such phenomena themselves inhibit the use of such a cell, for example as a power source for an electrically actuated watch, the usual zinc systems are not satisfactory; and in addition there is the practical difficulty of providing the cell in a proper small volume and shape for inclusion in a watch case along with the motor, train, and other parts for time indication.

A cell housing has a case 10 and a closing cover 11 upon which is supported a cathode 12 having a conductive extension 13 leading to the outer terminal 14; and an anode 15 having an extension 16 leading to the outer terminal 17. The case and cover may be of plastic; and a characteristic of the preferred construction is that the absence of gas evolution and the low volume change eliminates the need of heavy and internal-pressure resistant parts: for example, the case wall may be thin and even flexible, such as 0.010 inch thick. The electrode shapings and connecting parts may be made as described and claimed in the joint copending patent application Ser. No. 297,012 filed July 3, 1952, by George G. Ensign and myself; and the cathode 12 may be made as described and claimed in the copending patent application Ser. No. 297,011 filed July 3, 1952, by said George G. Ensign.

The anode 15 is of indium, a metal having a specific gravity of about 7.2. Its anodic conversion product, when used as described herein, appears to be a hydrated hydroxide having a formula closely corresponding to $In(OH)_3 \cdot H_2O$, with a specific gravity of about 5, which forms a gel with the alkaline electrolyte, this gel becoming more and more viscous as the quantity of anode product increases.

The preferred electrolyte for the system is highly alkaline. When 20 percent potassium hydroxide solution is employed, the anode conversion product tends to be anhydrous and non-gelling, possibly by formation of indium oxide, $In_2O_3$, wherewith the product forms a layer which limits the anode conversion; this anhydrous product being substantially absent when 30 percent potassium hydroxide solution is employed. It is presently preferred to employ alkaline solutions containing 35 to 45 percent of potassium hydroxide. When the concentration is above 50 percent, the voltage tends to be unstable and the operating load-circuit voltage is lower than with the preferred concentration.

Successful cells, having energy outputs of current exceeding 85 percent and even as high as 98 percent of the theoretical total conversion of the anode mass, have been made with use of 40 and 44 percent potassium hydroxide solution. It has been found that the addition to the electrolyte of up to 6 percent of tartaric acid, or an equivalent amount of potassium tartrate, is sometimes desirable, particularly with the lower range of alkali concentration, to hold the converted indium in viscous solution, possibly by inhibiting the formation of yellowish indium trioxide, $In_2O_3$, or by eliminating the effect thereof when originally present on the anode material. Further, when the surface film formation at the anode does not quickly pass to the gel condition, it has been found that the addition to the electrolyte of a crystal inhibitor such as a sugar (sucrose, corn syrup, invert sugar) in quantity of ½ to 2 percent by weight, is of advantage in regularizing the cell behavior.

Regularity of anodic behavior can also be induced, and is especially of value if the anode material has had lengthy exposure to air before assembly into the cell, by employing a pre-assembly cathodic cleaning wherewith nascent hydrogen can reduce any indium compound present, or by an anodic cleaning (before or after assembly) in alkaline electrolyte at a low or intermediate current density, wherewith the polarizing surface film is eliminated or converted to a non-polarizing condition.

Such cells may have an internal volume of 0.27 cubic centimeters, which at 55.8 cubic centimeters per faraday, permits a cell to be assembled for 130 milliampere hours output, using 0.026 cubic centimeter of indium as anode, sufficient to actuate a man's size wrist watch for a period of over a year, with a substantially constant open circuit voltage of 1.14–1.16 and a working voltage decreasing gradually from 1.10 to 0.90, and voltage during the open circuit part of the pulsing cycle decreasing gradually from 1.13 to 1.10, until it has delivered over 90 percent of the rated quantity of current. Such a cell occupies less than half the case space of the watch, e. g. the cell has an external volume of 0.45 cubic centimeter. Such illustrative cells have been operated at a current density of 100 milliamperes per square inch: and withstand overloads such as discharge through a resistance of 200 ohms in a pulse cycle in which the resistance is connected for 2 percent of the cycle time at a cycle rate of five per second.

In these illustrative cells, the cathode was a mixture of mercuric oxide particles, silver powder, and graphite particles in the ratios of 100:10:1, with 1 percent of polyvinyl formal added as a binder to maintain structural integrity throughout the cell discharge, as described and claimed in the aforesaid copending application Ser. No. 297,011.

When such a cell has been assembled and filled with electrolyte, the flash open-circuit voltage may be 1.38; but connection to a low load (such as 25 or 50 ohms) for five minutes or less causes a rapid drop to zero working voltage and, upon opening the load circuit, the voltage recovers rapidly to about 1.14 to 1.16, and then the cell operates at an external load of 500 ohms at a working voltage of about 1.09, at a load of 1000 ohms at about 1.12 volts, and with a load of 250 ohms about 1.04 volts, each at about 30 degrees C., and holding the same over long periods of time and through cycles of temperature variations from zero or below centigrade to 40 degrees and above. Cells have been operated to deliver in excess of 85 percent of theoretical current quantity, based on the weight of the indium anode with its integral terminal pin, with a gradual working voltage decrease to about 0.90 volt under the cyclically applied 400 ohms load, followed by a more rapid decrease toward the end of life under such loading; and when the cells were then opened, the originally fluid electrolyte was found to have become a thick pasty mass: the mercury had not migrated from the original cathode space, although the final cathode mass was easily friable and slight friction upon the exposed surface developed large globules of mercury.

For such effects, an excessive amount of water should be avoided in the electrolyte relative to the obtainable anode conversion products; but cells having about three times the theoretical amount of water to form the theoretical indium trihydroxide monohydrate have been successful in establishing the desired thickly viscous and immobilizing consistency of the electrolyte. It is preferred to have ample cathode material, so that exhaustion of the body of the anode or exhaustion of electrolyte action occurs rather than exhaustion of the cathode, in order that depolarizer is present throughout and effective to prevent gas generation.

The illustrative cells have the characteristics of high volumetric efficiency both on the internal volume and the external volume basis. The absence of increase of volume or change of shape of a sealed battery from gas evolution, from the formation of products of less average specific gravity than the original materials, or from the formation of non-mobile accretions on the anode or cathode which increase in size during cell action and press outward locally on the case wall, renders it unnecessary to have thick and strong cell walls to resist such effects in the sealed cell; and hence the external volume is not reduced by the space required for such walls and correspondingly a larger internal volume is available for the given total space. The internal volume is effectively employed as no special internal barriers nor gelling or thickening agent are required to hold in place any component which might become deleterious by migration, e. g. mercury moving from a cathode including mercuric oxide as a depolarizer.

Another characteristic is the long shelf life. When the cell is not connected to an external load, e. g. before it is placed in service by the user, the loss of active material is extremely low and a cell intended for a year or more of operational life (for example, the delivery of over 100 milliampere hours by a watch battery) suffers no such deterioration during a prior storage period of a year as to reduce the cell below this output. Coupled with this long shelf life is the behavior of rapidly returning toward the characteristic open circuit voltage, for the illustrated indium-alkaline electrolyte-mercuric oxide system, of about 1.14-1.16: this recovery can be measured in fractions of a second, as indicated by the above-stated returns, from a working voltage of 0.90 near the end of cell life with a 300-per-minute cyclic loading for 2 percent of the cycle by a resistance of 200 ohms, to a voltage of 1.10 immediately prior to the loading in the next cycle.

The characteristic of high electrochemical efficiency, e. g. a current quantity yield of over 85 percent of the theoretical conversion of indium metal to trivalent indium compound in the indium-alkaline electrolyte-mercuric oxide system, is important in obtaining a cell which occupies small space but is effective to deliver operational current to an electrically actuated watch for one or two years. Groups of cells have delivered up to 92 percent of theoretical with some cells even 98 percent. This compares most favorably with commercial small zinc cells which may deliver 50 percent or so of the theoretical.

The ability of the indium-alkaline electrolyte-reducible metal oxide system to operate under sealed condition is important for a battery for an electrically actuated watch or other instrument where the replaceable battery must be positioned in close association with mechanical parts which would be corroded by electrolyte escaping either as a result of imperfect sealing or by entrainment with a vented gas.

The electrolyte may be a water solution of potassium hydroxide, in a concentration of 25 to 50 percent. Sodium hydroxide to provide like effective alkaline concentration may be used. As stated above, additives may be employed. Illustrative comparison electrolytes (noting that 40 percent KOH solution has nearly maximum conductivity) are:

(1) 44 percent (C. P.) potassium hydroxide;
(2) 44 percent (C. P.) potassium hydroxide, with 1 or 2 percent sucrose;
(3) 44 percent (C. P.) potassium hydroxide, with 1 or 2 percent sucrose and 1 percent lithium chloride;
(4) 44 percent (C. P.) potassium hydroxide, with 1 or 2 percent of dextrose (corn syrup);
(5) 44 percent (C. P.) potassium hydroxide, with 6 percent tartaric acid radical (by addition of tartaric acid, cream of tartar, Rochelle salt);
(6) 44 percent (C. P.) potassium hydroxide, purified before use by electrolysis to remove the heavy metals such as iron, copper, manganese, silver, etc. present in minute traces even in CP alkali metal hydroxide.

The voluntary additives have functions of acting as hydrophilic agents to hold water away from the alkali and thus maintain the effective alkali concentration, to restrict hydration of conversion products by forming pasty or gel-like complexes with low amounts of hydration water in the molecule, to increase the etching or corrosion of the electrolyte upon the anode, and to inhibit crystallization of the products.

The mercuric oxide is illustrative of a reducible metal oxide which is effective in cathode depolarization and thus preventing gas formation at the cathode. Other depolarizing compounds may be used such as silver oxide, copper oxide, silver chloride; but the mercuric oxide is presently preferred for batteries which in self-contained and ready condition must have long shelf and operational life periods.

The shape of the anode may vary, e. g. a solid block filling a part of the housing or a wedge-shaped piece spaced from the housing wall may be used, but it is presently preferred to have a U-shaped structure as shown herein and as described and claimed in the copending application.

The rate of development of the paste or gel effect in the electrolyte, under the stated conditions, leads at about half discharged to a pasty elastic mass exhibiting thixotropy when disturbed and yielding a fluid efflux which rapidly becomes pasty again. Toward the end of cell activity, the mass has become as stiff as library paste, but the cell still exhibits rapid recovery toward the initial open-circuit working voltage.

It will be understood that the illustrative forms are not restrictive, and that indium may be employed as an anodic material with an alkaline electrolyte in many ways within the scope of the appended claims.

What is claimed is:

1. An electrical energy producing cell comprising a cathode, an alkaline electrolyte, and an anode having an active surface of indium.

2. An electrical energy producing cell comprising a cathode including a depolarizing substance, an alkaline electrolyte significantly free of heavy metals below indium in the displacement series, and an indium anode.

3. An electrical energy producing cell comprising a cathode including a substantially insoluble depolarizer, an alkaline electrolyte having an alkaline concentration equivalent to 25 to 50 per cent by weight of potassium hydroxide, and an indium anode.

4. An electrical energy producing cell comprising a cathode including a substantially insoluble depolarizer, an alkaline electrolyte, and an indium anode, the alkali concentration being from 25 to 50 percent computed as potassium hydroxide by weight and effective at the preselected working current density to inhibit the establishment of a polarizing effect at the anode.

5. A sealed electrical voltaic cell comprising a closed cell housing, a cathode including mercuric oxide particles, conductive particles and a plastic resistant to the electrolyte effective to bind the particles into a coherent conductive mass, an indium anode, and an electrolyte comprising an alkali metal hydroxide in concentration of 5.5 to 13.5 mols. per liter and effective to inhibit the formation of a polarizing effect at the anode, the quantity of electrolyte relative to the quantity of the anode material being effective during cell discharge to convert the indium present to a coherent gel containing a complex of indium compound associated with electrolyte components.

6. A sealed electrical voltaic cell comprising a closed cell housing a cathode including mercuric oxide particles, conductive particles and a plastic resistant to the electrolyte effective to bind the particles into a coherent conductive mass, an indium anode, and an electrolyte comprising an alkali metal hydroxide in concentration of 8.5–11.5 mols. per liter and effective to inhibit the formation of a polarizing effect at the anode, the quantity of electrolyte relative to the quantity of the anode material being effective during cell discharge to convert the indium present to a coherent gel containing a complex of indium compound associated with electrolyte components.

7. A sealed electrical cell comprising a closed cell housing, a cathode including mercuric oxide particles, silver particles and a plastic resistant to the electrolyte effective to bind the particles into a coherent conductive mass, an indium anode, and an electrolyte comprising an alkali metal hydroxide in concentration of 5.5 to 13.5 mols per liter and effective to inhibit the formation of polarizing effects at the anode the quantity of indium in the anode relative to the quantity of electrolyte being effective during the cell discharge to convert the electrolyte to a non-fluid gel containing a complex of indium compound associated with electrolyte components.

8. A sealed electrical cell comprising a closed cell housing, a cathode including mercuric oxide particles, carbon particles and a plastic resistant to the electrolyte effective to bind the particles into a coherent conductive mass, an indium anode, and an electrolyte comprising an alkali metal hydroxide in concentration of 5.5 to 13.5 mols per liter and effective to inhibit the formation of polarizing effects at the anode the quantity of indium in the anode relative to the quantity of electrolyte being effective during the cell discharge to convert the electrolyte to a non-fluid gel containing a complex of indium compound associated with electrolyte components.

9. A voltaic cell comprising a cathode including mercuric oxide, an alkaline electrolyte, and an anode presenting an active surface of indium, the electrolyte quantity and concentration being selected to be effective to react with the anode corrosion product to form a non-fluid conductive gel for preventing movement of the reduced mercury to the anode.

10. A voltaic cell comprising a cathode, an alkaline electrolyte and an indium anode, characterized in that the quantity and concentration of the electrolyte causes the cell to establish a polarizing effect in the absence of current flow and causes dissipation of the polarization effect upon draft of current at a predetermined normal rate of current flow from the cell, whereby the cell has a long shelf life when not in service.

11. A voltaic cell for supplying current to an electrically actuated wrist watch, comprising a cell housing and gas-tight sealing means for the same, a cathode including mercuric oxide, an alkaline electrolyte and an indium anode, the quantity of electrolyte being sufficient to essentially complete the filling of the sealed housing, the quantity and concentration of the electrolyte being effective to form a non-fluid gel with the anode corrosion product for preventing movement of the reduced mercury; the volume of the the cathode, anode and electrolyte products being essentially the same as the original internal volume of the sealed housing.

12. A sealed non-gas producing voltaic cell having substantially invariable external size and shape throughout the cell life; said cell comprising a housing and gas-tight means for sealing the same, a depolarizing cathode, an alkaline electrolyte, and an indium anode, said electrodes and electrolyte substantially filling the housing.

13. A sealed voltaic cell having substantially invariable external size and shape throughout the cell life; said cell comprising a housing and gas-tight means for sealing the same, a depolarizing cathode, an alkaline electrolyte of from 30 to 45 percent alkali calculated as potassium hydroxide, and an indium anode; said electrodes and electrolyte substantially filling the housing and characterized by the electrochemical inability of the said indium anode in the presence of the said alkaline electrolyte and said depolarizing cathode to cause the formation of gas during the life of said cell.

14. A sealed voltaic cell having substantially invariable external size and shape throughout the cell life; said cell comprising a housing and gas-tight means for sealing the same, a depolarizing cathode of mercuric oxide and conductive particles, an alkaline electrolyte of from 30 to 45 percent alkali calculated as potassium hydroxide, and an indium anode; said electrodes and electrolyte substantially filling the housing and characterized by the electrochemical inability of the said indium anode in the presence of said alkaline electrolyte and said depolarizing cathode to cause the formation of gas during the life of said cell.

15. A sealed voltaic cell having substantially invariable external size and shape throughout the cell life; said cell comprising a housing and gas-tight means for sealing the same, a depolarizing cathode of mercuric oxide, conductive particles, and a plastic binder, an alkaline electrolyte of from 30 to 45 percent alkali calculated as potassium hydroxide, and an indium anode; said electrodes and electrolyte substantially filling the housing and characterized by the electrochemical inability of the said indium anode in the presence of said alkaline electrolyte and said depolarizing cathode to cause the formation of gas during the life of said cell.

16. A balanced sealed electrical energy producing cell comprising an indium anode, an alkali metal hydroxide solution as electrolyte, and a cathode of depolarizing nature, the quantity and concentration of the electrolyte relative to the weight of the anode being effective to cause the complex formed by the electrolyte and the anode conversion product to become gel-like during the cell discharge and be essentially non-fluent at the termination of the cell discharge.

17. The method of preparing a voltaic cell having a cathode and an alkaline electrolyte, which comprises subjecting a mass of indium having a polarizing film of oxidized indium thereon to electrolytic action as electrode, and then assembling said mass as anode in the cell.

18. The method of preparing a voltaic cell having a cathode and an alkaline electrolyte with an indium anode having a passive oxidized indium coating thereon, which comprises the step of supplying current to the cell with the indium as cathode at the open-circuit potential of the working cell.

19. An electrical energy producing cell comprising a cathode, an indium anode, and an electrolyte, the viscosity of which increases during service whereby tendency in the cathodic mass toward migration is opposed.

20. An electrical energy producing cell comprising a cathode including a depolarizing substance, an indium anode and an electrolyte significantly free of heavy metals below indium in the displacement series, the viscosity of said electrolyte increasing during service whereby tendency in the cathodic mass toward migration is opposed.

21. An electrical energy producing cell comprising a cathode, an indium anode, and an electrolyte effective between the cathode and anode and active with the anode conversion product to form a substance effective to increase the viscosity of the electrolyte during service whereby tendency in the cathodic mass toward migration is increasingly opposed during service.

22. An electrical energy producing cell comprising a cathode including a depolarizing substance, an indium anode, and an electrolyte significantly free of heavy metals below indium in the displacement series and cooperative with the cathode and anode for conversion of the said depolarizing substance and the said anode by forming with the anode conversion product a substance which produces increase of the electrolyte viscosity during service whereby tendency in the cathodic mass toward migration is opposed.

No references cited.